(12) United States Patent
Lim et al.

(10) Patent No.: US 8,982,823 B2
(45) Date of Patent: Mar. 17, 2015

(54) METHOD AND APPARATUS FOR ALLOCATING TERMINAL IDENTIFIER IN WIRELESS ACCESS SYSTEM

(75) Inventors: Dongguk Lim, Anyang-si (KR); Hangyu Cho, Anyang-si (KR); Seunghyun Kang, Anyang-si (KR); Kyujin Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 169 days.

(21) Appl. No.: 13/698,232

(22) PCT Filed: May 16, 2011

(86) PCT No.: PCT/KR2011/003598
§ 371 (c)(1),
(2), (4) Date: Dec. 10, 2012

(87) PCT Pub. No.: WO2011/145852
PCT Pub. Date: Nov. 24, 2011

(65) Prior Publication Data
US 2013/0215840 A1   Aug. 22, 2013

Related U.S. Application Data

(60) Provisional application No. 61/345,143, filed on May 16, 2010.

(51) Int. Cl.
*H04W 72/04* (2009.01)
*H04W 4/00* (2009.01)
*H04W 8/26* (2009.01)

(52) U.S. Cl.
CPC .............. *H04W 72/04* (2013.01); *H04W 4/005* (2013.01); *H04W 8/26* (2013.01)
USPC ............ 370/329; 455/509; 455/436; 370/338

(58) Field of Classification Search
CPC ....... H04W 4/005; H04W 72/04; H04W 8/26; H04W 4/00
USPC ................ 370/329, 208, 331; 455/436, 435.1
See application file for complete search history.

(56) References Cited

U.S. PATENT DOCUMENTS

| | | | |
|---|---|---|---|
| 2005/0197123 A1* | 9/2005 | Chang et al. | 455/436 |
| 2005/0286407 A1* | 12/2005 | Park et al. | 370/208 |
| 2008/0159211 A1* | 7/2008 | Kwon et al. | 370/329 |
| 2009/0040970 A1* | 2/2009 | Ahmadi et al. | 370/329 |
| 2010/0008327 A1* | 1/2010 | Son et al. | 370/331 |
| 2010/0057485 A1* | 3/2010 | Luft | 705/1 |

(Continued)

FOREIGN PATENT DOCUMENTS

| | | |
|---|---|---|
| KR | 1020080067801 | 7/2008 |
| KR | 1020100008306 | 1/2010 |
| WO | 2011145852 A3 | 11/2011 |

*Primary Examiner* — Andrew Lai
*Assistant Examiner* — Mahmudul Hasan
(74) *Attorney, Agent, or Firm* — Lee, Hong, Degerman, Kang & Waimey (57) ABSTRACT

Disclosed is a method for allocating a terminal identifier through an initial network entry process with a base station in a wireless access system. The method comprises the steps of: receiving terminal type indication information indicating a M2M terminal from a terminal; constituting a second terminal identifier by adding bits of a predetermined number to the first terminal identifier on the basis of the terminal type indication information; and transmitting the second terminal identifier to the terminal.

11 Claims, 6 Drawing Sheets

(56) References Cited

U.S. PATENT DOCUMENTS

| | | | |
|---|---|---|---|
| 2010/0111061 A1* | 5/2010 | Zheng et al. | 370/338 |
| 2010/0172325 A1* | 7/2010 | Jung et al. | 370/331 |
| 2010/0182932 A1* | 7/2010 | Maheshwarl et al. | 370/254 |
| 2010/0208702 A1* | 8/2010 | Tinnakornsrisuphap et al. | 370/331 |
| 2010/0220668 A1* | 9/2010 | Yamada et al. | 370/329 |
| 2010/0323736 A1* | 12/2010 | Fischer et al. | 455/509 |
| 2011/0261712 A1* | 10/2011 | Park et al. | 370/252 |

\* cited by examiner

METHOD AND APPARATUS FOR ALLOCATING TERMINAL IDENTIFIER IN WIRELESS ACCESS SYSTEM

CROSS-REFERENCE TO RELATED APPLICATIONS

This application is the National Stage filing under 35 U.S.C. 371 of International Application No. PCT/KR2011/003598, filed on May 16, 2011, which claims the benefit of U.S. Provisional Application Ser. No. 61/345,143, filed on May 16, 2010, the contents of which are all hereby incorporated by reference herein in their entirety.

BACKGROUND OF THE INVENTION

1. Field of the Invention

This disclosure is relates to wireless access systems, and particularly to a method and apparatus for allocating a terminal identifier (STID) to an M2M terminal in a system that supports M2M communication.

2. Related Art

To allocate downlink or uplink resources to M2M terminals, a base station needs to be aware of what type a corresponding terminal has. In an M2M system, more terminals than those present in an existing system (802.16e, 802.16m or 3GPP LTE) (a few hundreds to a few thousands) may be present in a cell.

In case many terminals are present in a cell, an addressing scheme (12-bit STID) used in the existing system may not take up the many terminals.

SUMMARY OF THE INVENTION

This disclosure provides a method and apparatus of allocating an M2M terminal identifier (STID) through an initial network entry in a system that supports M2M communication.

In this disclosure, there is provided a method of allocating a terminal identifier through a network entry procedure in a wireless access system, the method comprising receiving terminal type indication information from a terminal to indicate an M2M terminal, adding a predetermined number of bits to a first terminal identifier based on the terminal type indication information to configure a second terminal identifier, and transmitting the second terminal identifier to the terminal.

Further, the first terminal identifier may have a size of 12 or 16 bits.

Further, the first terminal identifier may be a terminal identifier defined in a 802.16 system or a long-term evolution (LTE) system.

Further, the second terminal identifier may be transmitted through a ranging response message (RNG-RSP message) or a registration response message (REG-RSP message).

Further, the terminal type indication information may be configured of one or two bits.

Further, the terminal type indication information may be received from the terminal through a ranging request message or a registration request message.

Further, the predetermined number of bits may be 3 or 4.

Further, the predetermined number of bits may be determined as a predefined value.

Further, the second terminal identifier may be configured by positioning the predetermined number of bits before or behind the first terminal identifier or positioning some of the predetermined number of bits before the first terminal identifier and others of the predetermined number of bits behind the first terminal identifier.

In this disclosure, there is provided a method of allocating a terminal identifier through a network entry procedure in a wireless access system, the method comprising transmitting terminal type indication information to a base station to indicate an M2M terminal and receiving a terminal identifier from the base station, wherein the terminal identifier is configured by adding a predetermined number of bits to a first terminal identifier having a size of 12 or 16 bits.

Further, the first terminal identifier may be a terminal identifier defined in a 802.16 system or an LTE system.

In this disclosure, there is provided a method of allocating a terminal identifier (STID) through a network entry procedure in a wireless access system, the method comprising partitioning a terminal identifier into at least one group depending on the number of terminal types, receiving, from a terminal, terminal type indication information indicating the type of the terminal, and allocating a terminal identifier of the partitioned group corresponding to the terminal type indication information to the terminal.

Further, the terminal identifier may have a size of 12 or 16 bits.

Further, the terminal identifier may be a terminal identifier defined in a 802.16 system or an LTE system.

Further, the terminal type indication information may indicate an M2M terminal.

Further, the terminal type indication information may be received from the terminal through a network entry procedure.

In this disclosure, there is provided a method of allocating a terminal identifier through a network entry procedure in a wireless access system, the method comprising configuring a terminal identifier including a first terminal identifier having a size of 12 or 16 bits and a predetermined number of bits and allocating the configured terminal identifier to a terminal.

Further, the terminal may be a terminal supporting a 802.16 system or an LTE system or an M2M terminal.

Further, the first terminal identifier may be a terminal identifier (STID) defined in a 802.16 system or an LTE system.

Further, the predetermined number of bits of the terminal identifier may be positioned before, behind the first terminal identifier or some of the predetermined number of bits may be positioned before the first terminal identifier and others of the predetermined number of bits are positioned behind the first terminal identifier.

Further, the method further may comprise transmitting the configuration of the terminal identifier to the terminal through a super frame header (SFH), a map message, a header or a media access control (MAC) message.

Further, the predetermined number of bits may be determined as a predefined value Further, the predefined value may be configured of 0's or 1's only.

Further, the predetermined number of bits may be 4.

This disclosure provides a method of allocating an M2M terminal identifier (STID) through an initial network entry in a system that supports M2M communication, and thus may efficiently allocate terminal identifiers (STID) to M2M terminals in a cell.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or evolved UTRA (E-UTRA). IEEE 802.16m is the evolution of IEEE 802.16e, and it provides a backward compatibility with an IEEE 802.16e-based system.

UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m is chiefly described as an example in order to clarify the description, but the technical spirit of example embodiments of the present invention is not limited to IEEE 802.16m.

Figure 1:
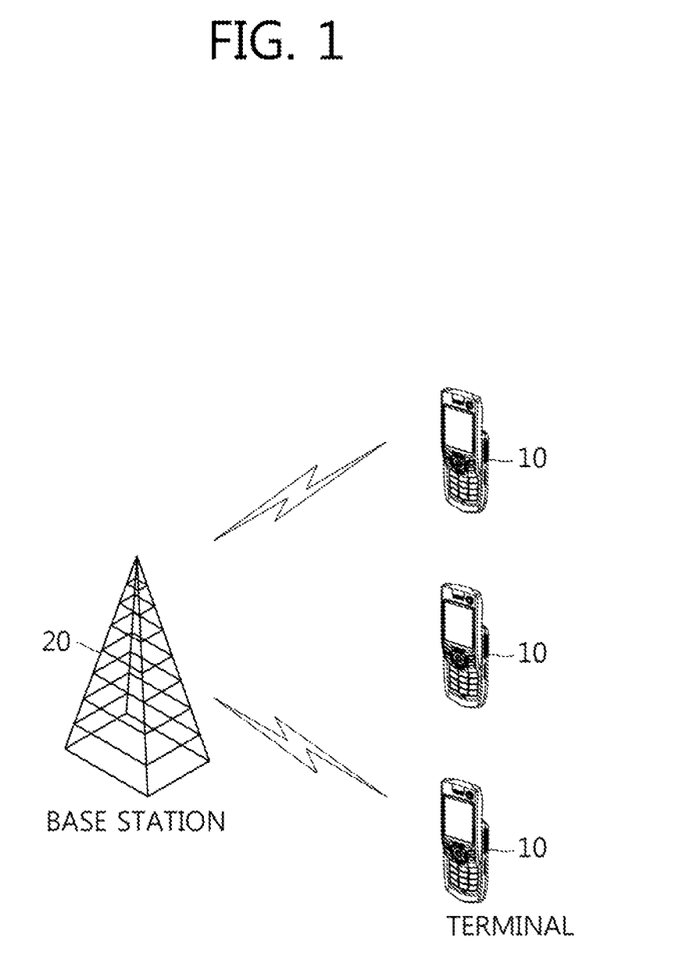
FIG. 1 is a block diagram illustrating a wireless communication system.

FIG. 1 is a block diagram illustrating a wireless communication system.

The wireless communication system is widely arranged to provide various communication services, such as voice or packet data services.

Referring to FIG. 1, the wireless communication system includes a terminal (mobile station, MS) 10 and a base station (BS) 20. The terminal 10 may be stationary or on the go and may be referred to by other terms, such as a user equipment (UE), a user terminal (UT), a subscriber station (SS), a wireless device, an advanced mobile station (AMS), etc.

The base station 20 is generally a fixed station that communicates with the terminal 10, and may be referred to by other terms, such as a NodeB, a base transceiver system (BTS), access point, etc. One or more cells may be present in the base station 20.

The wireless communication system may be an orthogonal frequency division multiplexing (OFDM)/orthogonal frequency division multiple access (OFDMA) based system.

The OFDM uses a plurality of orthogonal subcarriers. OFDM uses orthogonality between inverse fast Fourier transform (IFFT) and fast Fourier transform (FFT). A transmitter transmits data by performing IFFT. A receiver restores the original data by performing FFT on the received signal. The transmitter uses IFFT to combine multiple subcarriers, and the receiver uses corresponding FFT to separate the multiple subcarriers.

Further, a slot is the minimum possible data allocation unit and is defined by time and subchannel. In an uplink, a subchannel may be constituted of a number of tiles. The subchannel consists of 6 tiles, and in the uplink, one burst may consist of three OFDM symbols and one subchannel.

In partial usage of subchannels (PUSC) permutation, each tile may include 4 contiguous subcarriers over 3 OFDM symbols. Optionally, each tile may include three contiguous subcarriers over three OFDM symbols. A bin includes 9 contiguous subcarriers over the OFDM symbol. A band refers to a group of a fourth row of the bin, and an adaptive modulation and coding (AMC) subchannel consists of 6 contiguous bins at the same band.

Figure 2:
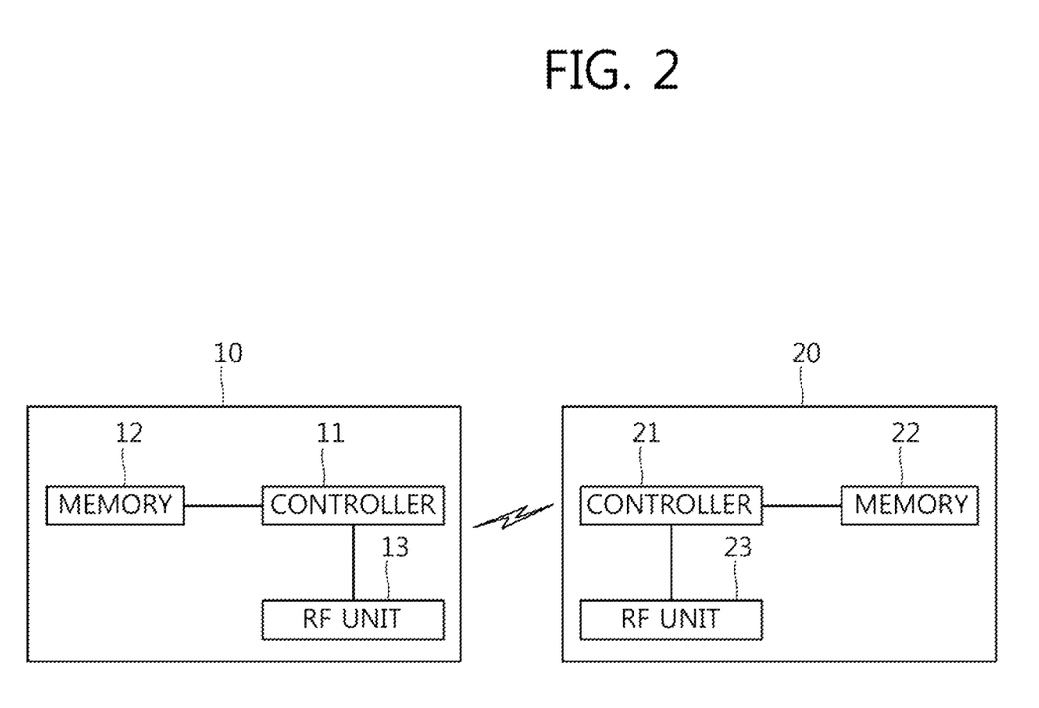
FIG. 2 is a block diagram illustrating a terminal and a base station in a wireless access system.

FIG. 2 is a block diagram illustrating a terminal and a base station in a wireless access system.

The terminal 10 may include a controller 11, a memory 12, and a radio frequency (RF) unit 13.

Further, the terminal may include a display unit and a user interface unit.

The controller 11 implements suggested functions, processes, and/or methods. The layers of the wireless interface protocol may be implemented by the controller 11.

The memory 12 is connected to the controller 11 and stores the protocol or parameters for performing wireless communication. That is, the memory 12 stores a terminal driving system, applications, and general files.

The RF unit 13 is connected to the controller 11 and transmits and/or receives wireless signals.

Additionally, the display unit displays various types of information of the terminal and may use well-known devices, such as a liquid crystal display (LCD), or organic light emitting diodes (OLED). The user interface unit may be implemented as a combination of well-known user interfaces, such as a keypad or a touch screen.

The base station 20 includes a controller 21, a memory 22, and an RF unit 23.

The controller 21 performs suggested functions, processes, and/or methods. The layers of a wireless interface protocol may be implemented by the controller 21.

The memory 22 is connected to the controller 21 and stores a protocol or parameters for performing wireless communication.

The RF unit 23 is connected to the controller 21 and transmits and/or receives wireless signals.

The controller 11 or 21 may include an application-specific integrated circuit (ASIC), other chipsets, logic circuits and/or data processing devices. The memory 12 or 22 may include a read only memory (ROM), a random access memory (RAM), a flash memory, a memory card, a storage medium and/or other storage devices. The RF unit 13 or 23 may include a baseband circuit to process wireless signals. When the embodiments are implemented in software, the above-described schemes may be implemented by modules (processes, or functions) that perform the above-described functions. The modules may be stored in the memory 12 or 22 and may be executed by the controller 11 or 21.

The memory 12 may be positioned in or outside the controller 11 or 21 and may be connected to the controller 11 or 21 via well-known means.

Figure 3:
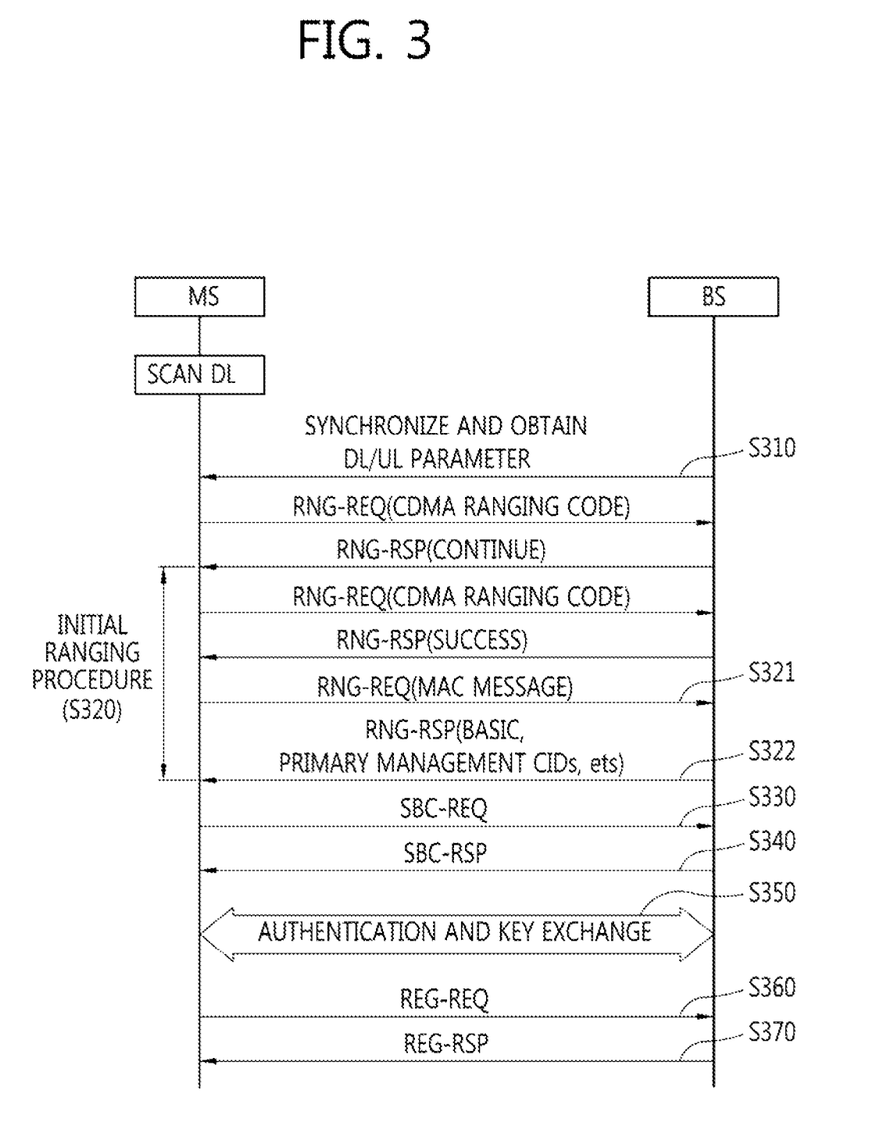
FIG. 3 is a flowchart illustrating an initial access scheme in a wireless communication system.

FIG. 3 is a flowchart illustrating an initial access scheme in a wireless communication system.

Referring to FIG. 3, the terminal 10 powers on and explores an accessible base station by scanning a downlink channel for initial access. At this time, since the terminal does not know information on network topology or configuration, the terminal performs scanning at each and every frequency.

The terminal 10 obtains system information on the downlink and up link from the explored base station 20 and terminates all system settings (S310), then performs a ranging procedure with the explored base station as shown in FIG. 3. The terminal performs ranging with the base station by a contention-based method that selects some CDMA ranging code and transmits the code to the base station, thereby performing synchronization with respect to the uplink (S320).

Until the synchronization is complete, the base station informs variables that need to be corrected through a ranging response message (hereinafter, RNG-RSP message). While the variables are corrected, the ranging response message is set in its status as "continue" and when the variable correction is done, the base station transmits an RNG-RSP message that indicates that the status is "success".

At this time, the RNG-RSP message transmitted from the base station 20 to the terminal 10 includes data transmission/reception frequency offset information, timing offset information, and power offset information of the terminal that is calculated by the base station based on a ranging request (hereinafter, RNG-REQ) code received from the terminal, and the terminal performs data transmission to the base station based on such information.

After confirming that the ranging code-based ranging request has been successfully done by the RNG-RSP message, the terminal transmits the RNG-REQ message to the base station (S321), and the base station transmits a corresponding RNG-RSP message to the terminal (S322). Upon transmission of the RNG-RSP message, the base station may also transmit a temporary station identifier (hereinafter, TSTID), with the TSTID included in the message. The TSTID is temporarily used to protect inter-station identifier (hereinafter, "STID") mapping after the network entry of the terminal.

Receiving the RNG-RSP message from the base station, the terminal transmits to the base station a subscriber station basic capability request message (hereinafter, SBC REQ message) that includes information on various parameters and authentication schemes supportable by the terminal for performing data transmission and reception with the base station (S330).

Receiving the SBC-REQ message from the terminal, the base station compares the parameter supported by the base station and authentication scheme with the parameter supported by the terminal and authentication scheme which are included in the SBC-REQ message. As a result of the comparison, the base station determines a parameter and authentication scheme to be used by the terminal for data transmission and reception with the base station and transmits to the terminal a subscriber station basic capability response message (hereinafter, SBC-RSP message) including the parameter and authentication scheme.

The terminal completes basic capability negotiation with the base station and then performs an authentication procedure with the base station. That is, the terminal and the base station authenticate each other and exchange an authorization key with each other (S350).

Thereafter, the terminal performs a base station registration process by exchanging a registration request message (hereinafter, REG-REQ message) and a registration response message (hereinafter, REG-RSP message) with the base station (S360, S370). The base station may make the terminal being assigned an STID to perform transmission and reception with the base station by transmitting an STID to the terminal upon transmission of the REG-RSP.

After the registration is made between the terminal and the base station, IP connectivity is established, time of day is established, and other operation parameters are transmitted. By doing so, a connection between the terminal and the base station is set up.

Machine-to-Machine (M2M) Communication

Hereinafter, M2M communication is briefly described.

Machine-to-machine (hereinafter, M2M) communication means, as it says itself, communication between an electronic device and another. That is, it means communication between objects. Although it generally refers to wired or wireless communication between electronic devices or communication between a machine and a device controlled by a human, it particularly denotes communication between electronic devices, i.e., inter-device wireless communication. Further, M2M terminals used in a cellular network are poorer in performance or capability than general terminals.

Further, an M2M environment has the following characteristics:

1. A number of terminals in a cell
2. Small data quantity
3. Low ofteness in transmission
4. Limited number of data features
5. Insensitive to time delay Many terminals are present in a cell, which may be distinguished from each other based on the type, class, or service type of the terminals. In particular, considering M2M communication (or machine type communication (MTC)), the number of all terminals may be sharply increased. The M2M terminals may have the following characteristics depending on their supporting services:

1. Intermittent data transmission. At this time, periodicity may be provided.
2. Of low mobility or fixed
3. Generally insensitive to latency in signal transmission Many M2M terminals in the cell, which have the above features, may transmit or receive signals to/from each other or to/from a base station by using a multi-hop configuration or by using a hierarchical structure.

That is, an M2M terminal may receive a signal from a base station and may transmit the signal to an M2M terminal that is present at another layer or at a lower layer, or may receive a signal from another M2M terminal and may transmit the signal to the other M2M terminal or base station. Or, direct communication may be done between terminals but not via a relay.

For signal transmission between M2M terminals having such general concept, the M2M terminals are connected to each other in the form of upper/lower structure and may transmit signals to each other (in the case of direct communication between the terminals, there may be no concepts of upper level and lower level, but the concepts of the upper and lower levels may apply to such case as well.)

As an example, in terms of downlink transmission, MS 1 receives a signal transmitted from the base station and transmits the signal to MS 2. At this time, MS 1 may also transmit the signal to another terminal MS that is positioned at a lower level, as well as to MS 2. Here, MS 2 refers to a terminal positioned at a lower level than that of MS 1.

Receiving a signal from MS 1, MS 2 transmits the received signal to the lower MS and further up to MS N in the same way. Here, a number of terminals may be connected to each other between MS 2 and MS N in a multi-hop or hierarchical manner.

As another example, in terms of uplink transmission, signals may be transmitted as follows for purposes of inter-M2M terminal signal transmission. The M2M terminal positioned at a lower level may transmit a signal to another M2M terminal or base station by using an M2M terminal positioned at an upper level.

The terms used in the M2M system are defined as follows:

(1) Machine-to-machine (M2M) communication: information exchange that may be performed without involvement of a human being between a device and a server in a core network through a base station or between user devices through a base station (2) M2M ASN: access service network that may support an M2M service (3) M2M device: terminal having (or supporting) an M2M function (4) M2M subscriber: consumer of an M2M service (5) M2M server: entity that may communicate with an M2M device. The M2M server provides an interface that may gain access by an M2M subscriber.

(6) M2M feature: unique feature of an M2M application supported by M2M ASN. One or more features may be needed for supporting an application.

(7) M2M group: group of M2M terminals including a common and/or same M2M subscriber, i.e., sharing one or more features.

Hereinafter, methods of allocating STIDs (Station Identifiers) to M2M terminals in a wireless access system suggested herein are described with reference to the accompanying drawings.

Hereinafter, although 802.16 (particularly, 802.16m) is described as an example, the method suggested herein is not limited thereto, and may also apply to LTE or LTE-A systems.

First Embodiment

A first embodiment provides a method of allocating a terminal identifier to an M2M terminal including an additional bit in the terminal identifier defined in the 802.16 system.

Figure 4:
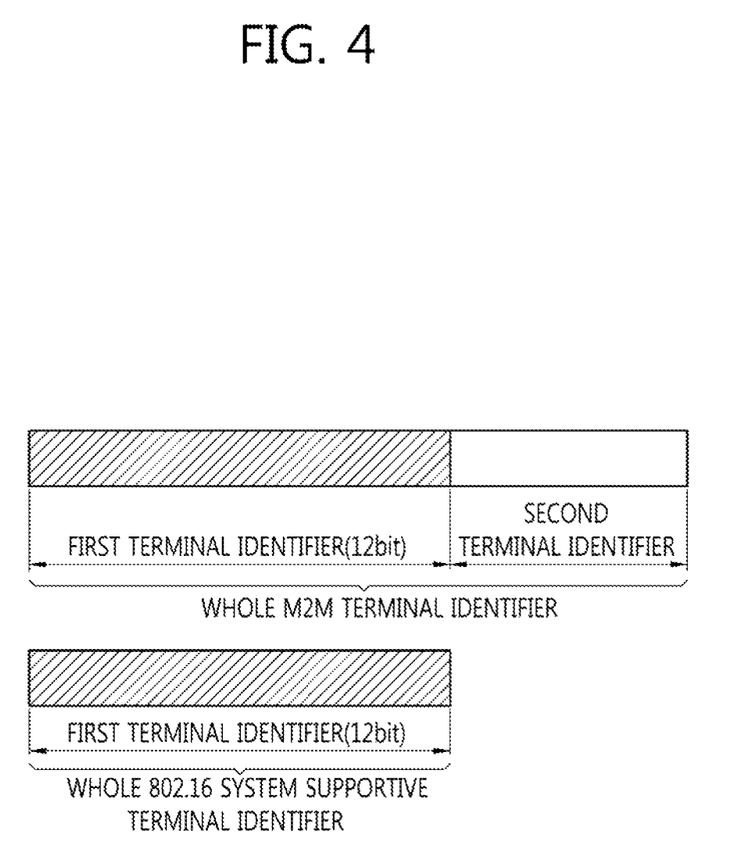
FIG. 4 is a view illustrating a method of allocating an STID to an M2M terminal according to a first embodiment of this disclosure.

FIG. 4 is a view illustrating a method of allocating an STID to an M2M terminal according to a first embodiment of this disclosure.

Referring to FIG. 4, an STID allocated to an M2M terminal has a form of a combination of an additional bit with an existing 12-bit STID. Here, the existing 12-bit STID may mean a terminal identifier defined in the 802.16 system. That is, after allocating a conventional STID to a terminal, the base station may transmit an additional bit generated for the M2M terminal by using a message or signaling and may add it to the STID of the M2M terminal, thereby increasing the length. At this time, assuming that N bits are added, the N bits are added to the existing 12 bits, so that the M2M terminal ends up with 12+N bits. Accordingly, by using the M2M terminal STID having the length of 12+N bits, the base station may allocate the STID to the terminal by 2N times more than the existing addressing.

The added N bits may be transmitted to the terminal together with a temporary STID (TSTID) when the base station transmits a ranging response (RNG-RSP) message, and may be stored in the memory of the terminal, which may be added to the STID in the base station registration step and may be used. Or, the added N bits may be transmitted together with the STID when the base station transmits a registration response (REG-RSP) message and may be then used.

The length of the added bits may be properly 3 or 4 bits in consideration of the length of a bandwidth request (hereinafter, BR) or A-MAP, but is not limited thereto.

At the initial network entry phase, the terminal may transmit to the base station a message including information indicating that the terminal has capability to support M2M communication or that the terminal is an M2M terminal. That is, the terminal transmits a device type indicator or terminal type indication information to the base station, so that the base station may identify the device type of the terminal through it. As an example, the terminal sets the M2M capability field in the registration request (REG-REQ) message or ranging request (RNG-REQ) message as '1' and transmits it to the base station. This becomes an indicator that indicates that the terminal is an M2M terminal. From the M2M capability field that is set as 1, the base station identifies that the terminal is an M2M terminal and may communicate information signals necessary for supporting M2M with the terminal in subsequent communication processes. Further, since the M2M capability field is set as 1, an M2M group ID or M2M Device ID may be separately assigned to the corresponding terminal.

Further, the device type indicator or terminal type indication information may be transmitted to the base station through a capability negotiation step between the terminal and the base station. In such case, the information may be included in an SBC-REQ message and may be then transmitted.

According to an embodiment of this disclosure, the base station may variably generate the type or length of added bits depending on the device type of a terminal identified by the device type indicator transmitted from the terminal. At this time, the received device type indicator may consist of one or two bits, but as necessary, the length thereof is not limited thereto.

According to an embodiment of this disclosure, the same existing STID is used for both the M2M terminal and the non-M2M terminal, and the additional bits are used only for the M2M terminal. At this time, in the case of the non-M2M terminal, the base station may transmit to the terminal an information signal including additional information, such as QoS, in the STID. The length of the additional signal including the additional information may be the same as the length of the additional bits for the STID of the M2M terminal, so that the STID of the M2M terminal including the additional bits may be the same in length as the information signal of the non-M2M terminal (e.g., HTC) including the additional information. Accordingly, the base station may support the M2M device without influencing the existing device, and at this time, the base station may identify the M2M device through the device type indicator transmitted by the M2M device.

As described above, in case additional bits for the STID for the M2M device are the same in length as the additional information bits of the existing device, an additional signaling or procedure may be needed to distinguish an M2M device from a non M2M device. Accordingly, to reduce an additional signaling or process that increases overhead, the following method may be used to allocate the STID of the M2M device. For example, in 802.16m, BR is performed with 16 bits that are obtained by adding 4-bit predefined BR index to the STID of the terminal. The base station transmits a 16-bit information signal including the STID and BR information to the terminal. Here, 4 bits are defined and added for the M2M terminal. In case 16-bit STID is used, information signal and STID both may be generated, and thus, the base station needs to distinguish the two from each other.

For this, the base station partitions the existing 12-bit STID and may specify only some of the STIDs for the M2M terminal. In such case, only some of all 12-bit STIDs are used by the M2M terminal and the rest is used by other terminals than the M2M terminal, and thus, the STID of the M2M terminal is not the same as the information signal of non-M2M terminal. Among all the STIDs, some sections may be specified or may be randomly selected and specified. The section or number of specified STIDs may be variably defined. Further, since the specified STIDs only are used for the M2M terminal, N bits may be added only to the specified STIDs.

Upon initial network entry, the terminal may transmit to the base station a message including information indicating that the terminal is an M2M terminal or a terminal that supports inter-device communication. Receiving such message, the base station is aware that the terminal is an M2M terminal and assigns an M2M group indicator and an M2M device indicator to the corresponding terminal through an REG-RSP message.

In the above situation, because the STID itself is specified by the M2M terminal, the base station may use this as an M2M group indicator for the M2M terminal without separate allocation. Further, added N bits following the M2M group indicator may be used as an M2M device indicator belonging to each group to distinguish terminals from each other.

In an embodiment of this disclosure, the base station may use as a fixed predefined value the N bits added to distinguish the STID of the same M2M terminal from the information signal of a non-M2M terminal. If the N bits for the M2M terminal are selected not to be the same as the additional information of the non-M2M terminal and used as a fixed value, although the M2M terminal is the same in the 12-bit STID as the non-M2M terminal, the 12+N length of M2M terminal STID may not be the same as the information signal of the non-M2M terminal.

The added N bits may include the class, service type, or group indicator of the M2M terminal or an M2M terminal indicator. For example, the added N bits may consist of j+k bits, where j bits are used for STID, and k bits are used for the specifying information.

In an embodiment of this disclosure, the added bits may come before or behind the STID. Accordingly, it may be positioned at the MSB or LSB of the M2M terminal STID. Or, the added bits may be divided into two, each of which may be positioned at the MSB or LSB. The position of the added bits has been described for three examples, but is not limited thereto.

Second Embodiment

According to a second embodiment, some of terminal identifiers defined in the 802.16 system are assigned for the terminal identifier of an M2M terminal.

Figure 5:
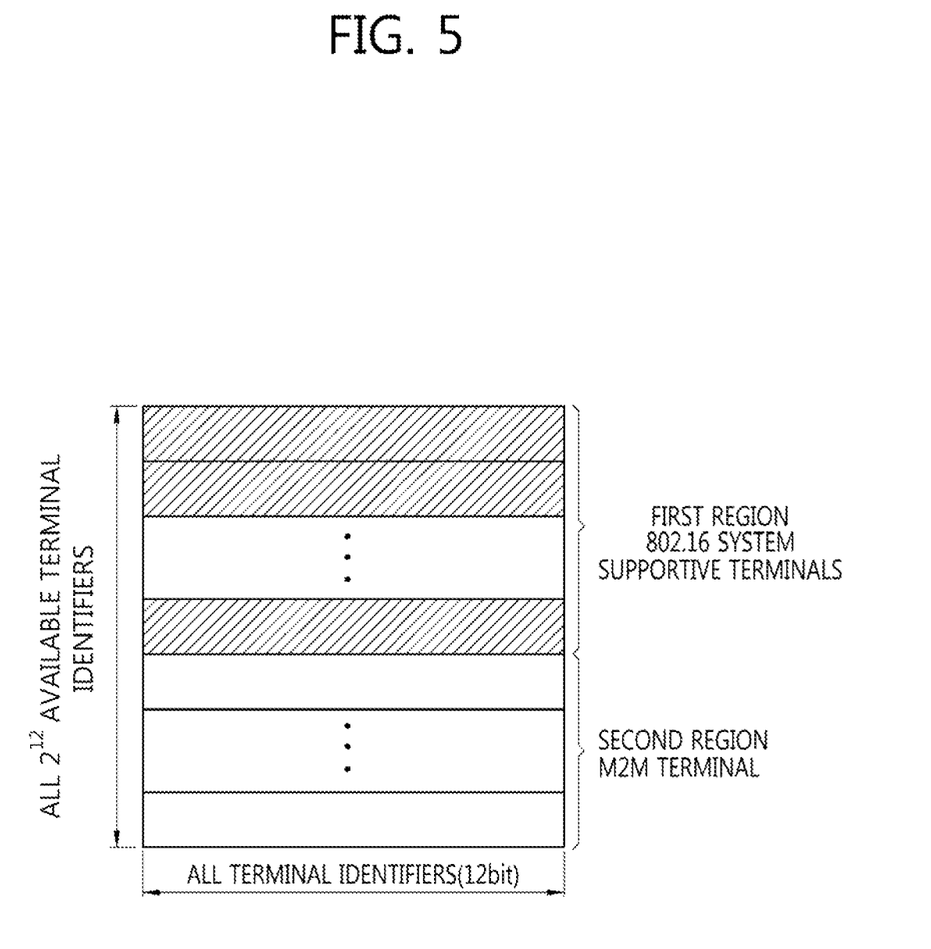
FIG. 5 is a view illustrating a method of allocating an STID to an M2M terminal according to the second embodiment of this disclosure.

FIG. 5 is a view illustrating a method of allocating an STID to an M2M terminal according to the second embodiment of this disclosure.

Referring to FIG. 5, the base station assigns the existing 12-bit STID to the terminal. At this time, the base station may partition the STID and may specify some of the STIDs to an M2M terminal. Some sections of the entire STID may be specified or among all the STIDs, some may be randomly selected and specified. Or, the section or number of STIDs specified may be variably defined.

Referring to FIG. 5, an addressing method using the existing STID is used, and thus, the base station may support 2N terminals, and thus, there is difficulty in supporting a few hundred or thousand terminals in the base station cell.

Accordingly, the base station may determine an idle mode or sleep mode of the terminal by using information received from the terminal to supplement the insufficient STIDs and may get back the STIDs of the terminals remaining in idle or sleep mode. The returned STIDs may be used for terminals that attempt to newly perform network initial entry in the cell of the base station. The return of the STIDs may apply to non-M2M terminals as well as M2M terminals.

The base station may transmit an additional information signal to support an M2M terminal. Such information signal may be transmitted to the terminal through a message or a superframe header (SFH) or a map message. The M2M terminal may use an increased length of STIDs by using the information signal and the 12-bit STID received from the base station. For example, if the received information signal includes N bits, the M2M terminal may use an 12+N bits of STID. Or, the terminal may use the added N-bit information signal as an M2M device type indicator or an M2M group indicator.

Third Embodiment

According to a third embodiment, a new terminal identifier is defined, and a method is provided that provides the terminal identifier to an M2M terminal.

Figure 6:
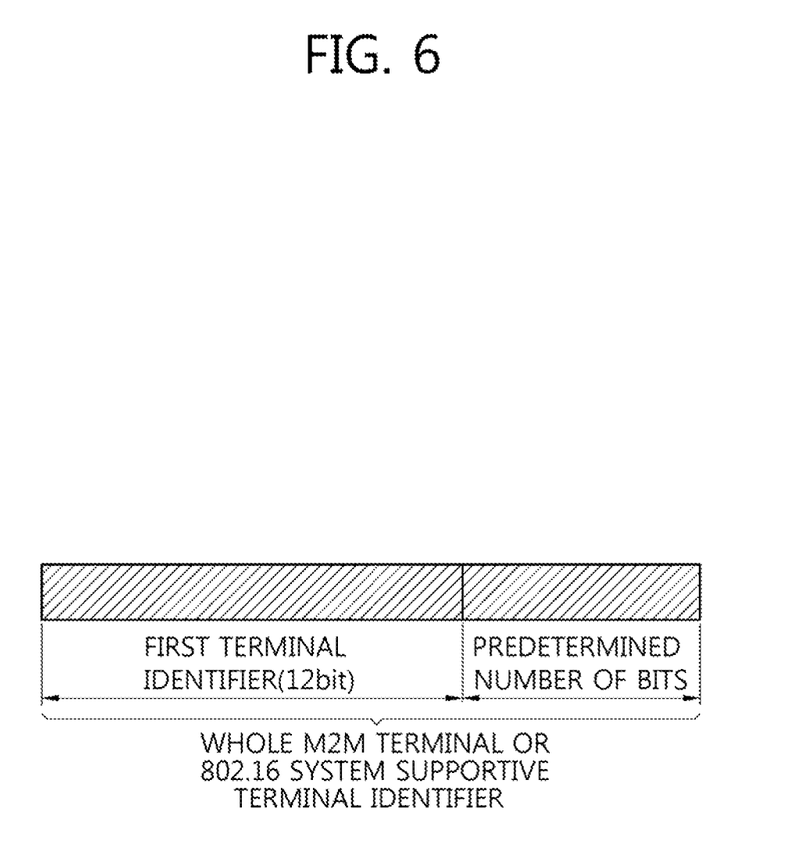
FIG. 6 is a view illustrating a method of allocating an STID to an M2M terminal according to a third embodiment of this disclosure.

FIG. 6 is a view illustrating a method of allocating an STID to an M2M terminal according to a third embodiment of this disclosure.

Referring to FIG. 6, the base station allocates an STID that has been increased in length from the existing 12 bits long to a terminal so as to be able to support all the terminals present in the cell. The length-increased STID may be defined to have M bits, where M has a value larger than 12. Accordingly, the base station may support 2M terminals the number of which is larger than that in the existing addressing method.

The increased-length of M-bit STID may be used for the M2M terminal.

For the non-M2M terminal, M-12 bits may be added to the existing 12-bit STID, so that increased M bits may be provided for use. At this time, since the STID of the M2M terminal may be the same as the STID of the non-M2M terminal, the base station may use a predetermined single value for the M-12 bits added to the non-M2M terminal to distinguish the two from each other. At this time, the predefined value may be constituted of 0's or 1's only. As an example, in case the M-12 bits are four bits, the predefined value may be '0000' or '1111'.

For the non-M2M terminal, a fixed value of added bits may come before or behind the existing 12-bit STID. Accordingly, it may be positioned at the MSB or LSB of the STID. Or, the fixed value of added bits may be divided into two, each of which may be positioned at the MSB or LSB. The position of the added bits has been described for the above three examples, but is not limited thereto.

Further, for the non-M2M terminal, the base station may transmit necessary information to the terminal to extract the existing 12-bit STID from the M bits. Such information may be transmitted through a superframe header (SFH), a map message, a header or an MAC message.

For the base station to extract the existing 12-bit STID from the M bits for the non-M2M terminal, a method, such as scrambler, puncturing, or polynomial, may be used, and while the terminal receives services from the base station, only one of the methods may be used or the methods may be changed per frame or superframe, or every plural frames or superframes.

The base station may partition the existing 12-bit STID and may specify only some of the STIDs for the M2M terminal. Among the entire STID, some sections may be specified or among all the STIDs, some may be randomly selected and specified. Further, the section or number of the specified STIDs may be variably defined. Or, the base station may use M bits of STID only for the specified STID.

In the above case, since the STID itself is specified for the M2M terminal, the base station may use this as an M2M group indicator for the M2M terminal without separate resource allocation. Further, the added N bits following the M2M group indicator may be used as an M2M device indicator belonging to each group to distinguish terminals from each other.

According to the embodiments of this disclosure, in the method of allocating an STID to an M2M terminal, part of an STID assigned from the base station to an M2M terminal is basically constituted of an existing 12-bit STID, and thus, the base station may allocate the same STID as is assigned to a non-M2M terminal to the M2M terminal. Accordingly, no additional procedure is required for the existing allocation method to assign the M2M STID, and complexity of the base station for allocating the M2M STID may be reduced. Further, the STID allocation method according to the embodiments of this disclosure may support a few hundred or thousand M2M terminals present in the cell of the base station.

What is claimed is:

1. A method of allocating a terminal identifier through a network entry procedure in a wireless access system, the method comprising:
   receiving terminal type indication information from a terminal to indicate machine-to-machine (M2M) terminal;
   adding a predetermined number of bits to a first terminal identifier based on the terminal type indication information to configure a second terminal identifier; and
   transmitting the second terminal identifier to the terminal,
   wherein the predetermined number of bits is 3 or 4,
   wherein the predetermined number of bits is determined as a predefined value, and
   wherein the second terminal identifier is configured by positioning some of the predetermined number of bits before the first terminal identifier and others of the predetermined number of bits behind the first terminal identifier.

2. The method of claim 1, wherein the first terminal identifier has a size of 12 or 16 bits.

3. The method of claim 1, wherein the first terminal identifier is a terminal identifier defined in a 802.16 system or a long term evolution (LTE) system.

4. The method of claim 1, wherein the second terminal identifier is transmitted through a ranging response message (RNG-RSP message) or a registration response message (REG-RSP message).

5. The method of claim 1, wherein the terminal type indication information is configured of one or two bits.

6. The method of claim 1, wherein the terminal type indication information is received from the terminal through a ranging request message or a registration request message.

7. A method of allocating a terminal identifier through a network entry procedure in a wireless access system, the method comprising:
   configuring a terminal identifier including a first terminal identifier having a size of 12 or 16 bits and a predetermined number of bits; and
   allocating the configured terminal identifier to a terminal,
   wherein the predetermined number of bits is 3 or 4,
   wherein the predetermined number of bits is determined as a predefined value, and
   wherein some of the predetermined number of bits are positioned before the first terminal identifier and others of the predetermined number of bits are positioned behind the first terminal identifier.

8. The method of claim 7, wherein the terminal is a terminal supporting a 802.16 system or a long-term evolution (LTE) system or a machine-to-machine (M2M) terminal.

9. The method of claim 7, wherein the first terminal identifier is a terminal identifier (STID) defined in a 802.16 system or an LTE system.

10. The method of claim 7, further comprising transmitting the configuration of the terminal identifier to the terminal through a super frame header (SFH), a map message, a header or a media access control (MAC) message.

11. The method of claim 7, wherein the predefined value is configured of 0's or 1's only.

* * * * *